March 23, 1971  A. E. TSCHANZ  3,572,159
MOTION TRANSMITTING REMOTE CONTROL ASSEMBLY
Filed June 12, 1969
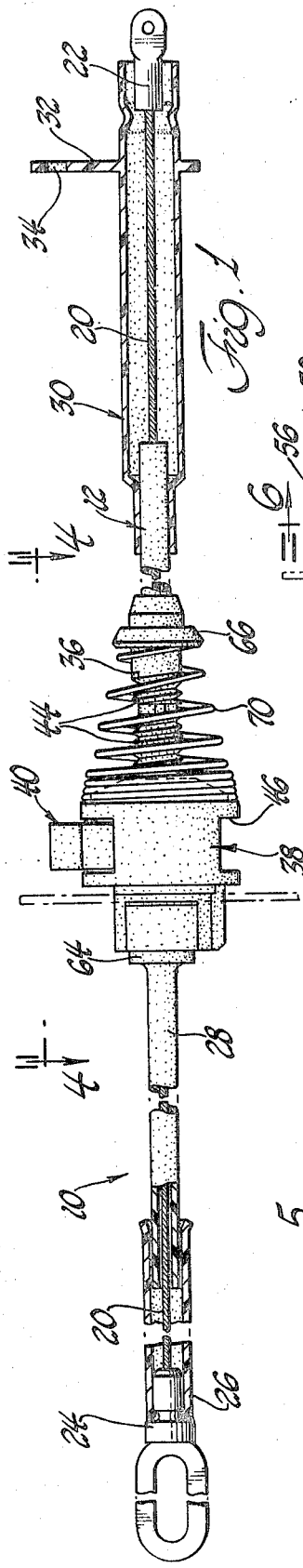
INVENTOR.
August E. Tschanz
BY
Barnard, McGlynn & Reising
ATTORNEYS United States Patent Office 3,572,159
Patented Mar. 23, 1971

3,572,159
**MOTION TRANSMITTING REMOTE
CONTROL ASSEMBLY**
August E. Tschanz, Dryden, Mich., assignor to Teleflex
Incorporated, North Wales, Pa.
Filed June 12, 1969, Ser. No. 832,760
Int. Cl. F16c 1/10
U.S. Cl. 74—501                    12 Claims

ABSTRACT OF THE DISCLOSURE

A motion transmitting remote control assembly including a conduit movably supporting a motion transmitting core element. A fitting is disposed about the conduit adjacent one end for attaching the conduit to the support structure. An elongated circular adjustment means having threads or teeth thereabout is attached to the conduit adjacent the other end and extends through a support means or member adapted for attachment to a support structure. A locking member is supported in a passageway extending through the support member transversely to the axis of the conduit and has a first circular bore therethrough with teeth thereabout and a second larger circular bore therethrough so that the locking member may be moved between a first position wherein the adjustment means may be moved longitudinally through the support member and a second position wherein the teeth in the small circular bore engage the teeth on the adjustment member to prevent longitudinal movement of the adjustment member. A biasing means or spring reacts between the adjustment member and the support member to urge relative movement therebetween.

---

The instant invention relates to a motion transmitting remote control assembly of the type wherein motion is transmitted in a curved path by a flexible motion transmitting core element movably supported by a flexible conduit.

Such remote control assemblies normally include means adjacent each end of the conduit for attaching the conduit to a support structure with the core element extending from each end of the conduit. It is frequently desirable to adjust the length of the conduit to change the position of one end of the core element extending from the conduit once the assembly is installed. An example of such a situation is wherein a remote control assembly is utilized to interconnect the accelerator pedal and a carburetor operating lever arm in an automobile. In this situation, the assembly is usually installed by attaching the conduit to the body of the automobile adjacent the accelertor pedal while attaching the end of the core element extending therefrom to the accelerator pedal. The opposite end of the conduit is then attached to a support structure adjacent the carburetor so that the other or opposite end of the core element may be attached to the operating lever of the carburtor. Frequently, however, the end of the core element adjacent the carburetor does not extend from the conduit a proper amount for attachment to the operating lever of the carburetor. During such installation the accelerator pedal is in its unmoved or idle position as is the operating lever of the carburetor and if the end of the core element adjacent to the operating lever of the carburetor is not positioned correctly, the operating lever of the carburetor must be moved for attachment to the core element so that the end result is that the accelerator pedal is in the idle position but the operating lever of the carburetor is not. The position of the end of the core element extending from the conduit, i.e., the distance the core element extends from the conduit, may be changed by altering the length of the path over which the conduit extends. Assemblies for accomplishing such an adjustment are shown in U.S. Pats. 3,289,491 and 3,393,578 both of which are assigned to the assignee of the instant invention. The assembly shown in these patents employ rotating threaded members which must be manually rotated to gradually change the length of the conduit. Such assemblies are excellent for small adjustments which require little time but are not satisfactory in situations where the adjustment may be significant and must be made rapidly. Another remote control assembly for accomplishing such an adjustment is shown in copending application Ser. No. 832,709, filed June 12, 1969 in the name of Peter A. Stahr, concurrently herewith, and assigned to the assignee of the instant invention, the instant invention being an improvement thereover and providing an alternative solution to the adjustment problem.

Accordingly, it is an object and feature of this invention to provide a motion transmitting remote control assembly including a conduit for movably supporting a core element with adjustment means attached to the conduit and support means adapted for attachment to a support structure with locking means supported by the support means for movement between first and second positions for allowing relative movement between the adjustment means and the support means when in the first position and for preventing such relative movement when in the second position.

In correlation with the foregoing object and feature, it is another object and feature of this invention to provide such a remote control assembly wherein the locking means includes a first plurality of teeth thereon and the adjustment means includes a second plurality of teeth thereon which are in meshing engagement with one another when the locking means is in the second position to prevent relative movement between the adjustment means and the support means.

Other objects and attendant advantages of the present invention will be readily appreciated as the same becomes better understood by reference to the following detailed description when considered in connection with the accompanying drawings wherein:

FIG. 1 is a fragmentary elevational view partially in cross section of a preferred embodiment of the instant invention;

FIG. 2 is a fragmentary cross sectional view of that portion of the preferred embodiment of FIG. 1 utilized to adjust the longitudinal position of the conduit and shown in the position for allowing such adjustments;

FIG. 3 is a fragmentary cross sectional view similar to FIG. 2 but illustrating the position wherein longitudinal movement of the conduit is prevented;

FIG. 4 is a fragmentary view taken substantially along line 4—4 of FIG. 1;

FIG. 5 is a cross sectional view taken substantially along line 5—5 of FIG. 2; and FIG. 6 is a cross sectional view taken substantially along line 6—6 of FIG. 3.

Referring now to the drawings wherein like numerals indicate like or corersponding parts throughout the several views, a motion transmitting remote control assembly constructed in accordance with the instant invention is generally shown at 10.

The motion transmitting remote control assembly includes a conduit which is generally indicated at 12. The conduit 12 is preferably of the type including an inner tubular member 14 made of organic polymeric material and surrounded by a plurality of long lay wires 16 disposed helically thereabout with a casing 18 of organic polymeric material disposed about the long lay wires 16 and the inner tubular member 14. The conduit 12 is flexible along its length.

A motion transmitting core element 20 is movably supported by the conduit 12 with the ends thereof extending from opposite ends of the conduit. The motion transmitting core element 20 is cable like in that it comprises metal strands helically wound together. It will be understood, however, that the core element 20 may take many different forms, as, for example, it may be wire-like. A metal coupling member 22 is swaged or otherwise secured to one end of the core element 20 and a metal coupling member 24 is swaged or otherwise secured to the other end of the core element 20. A sleeve-like umbrella 26 is secured to the coupling member 24 and is in sliding telescoping relationship with the tubular extension 28 which forms an extension of the adjustment means to be more fully hereinafter described.

A fitting generally indicated at 30 is attached to one end of the conduit 12 and is adapted by the flange 32 and the hole 34 for attaching the conduit 12 to a support structure. The fitting 30 is preferably made of an organic polymeric material molded about the conduit 12 so as to be immovable relative thereto.

There is included an adjustment means comprising the elongated member 36 attached to the conduit 12 adjacent the second end thereof. The adjustment means 36 is preferably made of an organic polymeric material molded or otherwise disposed about the conduit 12 so as to be immovable relative thereto.

There is also included a support means comprising the support member generally indicated at 38 adapted for attachment to a support structure.

Locking means comprising the locking member generally indicated at 40 is supported by the support member 38 for movement between first and second positions for allowing relative movement between the adjustment means or member 36 and the support member 38 in a direction longitudinally of the conduit 12 when in the first position illustrated in FIGS. 1, 2 and 5, and for preventing such relative movement when in the second position as illustrated in FIGS. 3 and 6. The locking member 40 includes a first plurality of teeth 42 formed therein, the teeth actually taking the form of threads. The adjustment member 36 includes a second plurality of teeth 44 thereon, again, the teeth 44 being in the form of threads. The first and second plurality of teeth 42 and 44 are in meshing engagement in the second position as illustrated in FIGS. 3 and 6. The teeth 42 and 44 define coacting irregularities which are in interlocking engagement when the locking member is in the second position to prevent relative movement between the adjustment member 36 and the locking member 14.

The support member 38 has a first passageway 46 extending therethrough and in a direction generally transverse or perpendicular to the longitudinal axis of the conduit 12 or the adjustment member 36. The locking member 40 is disposed in the passageway 46 for movement between the first and second positions in a direction generally transverse or perpendicular to the longitudinal axis of the conduit 12 or the adjustment member 36.

The adjustment member 36 has a circular cross section as illustrated in FIGS. 5 and 6. The locking member 40 includes a first circular bore 48 extending therethrough as illustrated in FIG. 5. The teeth 42 are disposed about the circular bore 48. The locking member 40 also includes a second larger circular bore 50, as best illustrated in FIG. 6, which is larger in diameter than the diameter of the circular adjustment member 36 for allowing the adjustment member to move longitudinally therethrough and through the support member 38. The support member is preferably made of organic polymeric material and has a second passageway 52, as illustrated in FIGS. 2 and 3, extending therethrough in which the adjustment member 36 is disposed. A tongue and groove means, which comprises the tab or tongue 54 and the groove 56, operatively interconnects the locking member 40 and the support member 38 to guide movement of the locking member 40, the tab or tongue flange 54 being an extension of the locking member 40 with the groove 56 being disposed in the support member 38. The support member 38 has a circular periphery as illustrated in FIGS. 5 and 6 and the locking member 40 includes an arcuate cap 58 which is contiguous with or aligned with the circular periphery of the support member 38 when in the second or locked position as illustrated in FIG. 6.

The support member 38 also includes a snap-in means generally indicated at 60 for insertion through an opening in a support structure to retain the support member 38 to the support structure. The support structure being a bulkhead or the like as illustrated in phantom with the snap-in means 60 extending therethrough. The snap-in means 60, therefore, adapts the support member 38 for attachment to a support structure. It will be understood that various means may be utilized for attaching the support member 38 to a support structure. The specific snap-in means 60 which is illustrated is more specifically described and claimed in U.S. Pat. 3,427,894.

The locking means or member 40 also includes positioning means for maintaining the locking member in the first position illustrated in FIG. 5. The circular bores 48 and 50 are in overlapping relationship so as to define an opening therebetween and the positioning means comprises the extremities 62 of that opening. The extremities 62 are spaced apart a distance which is less than the diameter of the adjustment member 36 so that the locking member 40 may be snapped into and out of the second position where the threads 42 are in meshing engagement with the threads 44. Thus, because the extremities 62 of the opening between the circular bores is less than the diameter of the adjustment member 36, the locking member 40 will be maintained in the unlocked position illustrating FIG. 5 to allow the adjustment member 36 to be moved longitudinally therethrough.

The adjustment means or member 36 also includes limit means comprising a pair of radial flanges 64 and 66 disposed at spaced positions along the adjustment member 36 and cooperable with the support member 38 to limit relative movement between the adjustment member 36 and the support member 38. The flange 64 is formed integrally with the adjusting member 36 and with the tubular extension 28. The flange 66 is snapped into position and retained to the adjustment member 36.

There is also included a biasing means comprising the spring 70 disposed between the support member 38 and the adjustment member 36 for urging the adjustment member to move relative to the support member. More specifically, the spring 70 is disposed between the support member 38 and the flange 66 for urging the adjustment member 36 to move relative to the support member 38.

The motion transmitting remote control assembly is installed by attaching the fitting 30 to a support structure and the coupling 22 to a control element and attaching the support member 38 to a support structure as by inserting snap-in means 60 through an opening in a bulkhead or the like. In this condition the position of the coupling member 24 as the end of the core element 20 is a given distance from the support member 38. To increase the distance of the coupling member 24 from the support member 38, the adjustment member 36 is moved longitudinally through the support member 38 to thereby decrease the length of the path over which the conduit 12 is disposed between the support member 38 and the fitting 30, which in turn moves the core element and the coupling 24 to the left as illustrated in FIG. 1. When the coupling 24 has been moved a sufficient amount to the left, as illustrated in FIG. 1, the locking member 40 is moved from the first position illustrated in FIGS. 1, 2 and 5 to the second or locked position illustrated in FIGS. 3 and 6 where the first plurality of teeth 42 engage the second plurality of teeth 44 to prevent further movement of the adjustment member 36 relative to the support member 38. The position of the coupling may be adjusted to the right as viewed by moving the adjustment member in the opposite direction.

The embodiments of the invention in which an exclusive property or privilege is claimed are defined as follows:

1. A motion transmitting remote control assembly comprising; a conduit, a core element movably supported by said conduit with the ends thereof extending from the ends of said conduit, a fitting adjacent one end of said conduit for attaching said conduit to a support structure, adjustment means attached to said conduit adjacent the second end thereof, support means adapted for attachment to a support structure, locking means supported by said support means for movement between first and second positions for allowing relative movement between said adjustment means and said support means in a direction longitudinally of said conduit when in said first position and for preventing said relative movement when in said second position, said adjustment means having a plurality of irregularities so that said adjustment means may be disposed in various positions relative to said support means and said locking means moved to said second position in interlocking engagement with at least one of said irregularities.

2. An assembly as set forth in claim 1 wherein said locking means includes a first plurality of teeth therein and said irregularities comprise a second plurality of teeth on said adjustment means, said first and second plurality of teeth being in meshing engagement in said second position.

3. An assembly as set forth in claim 2 wherein said locking means includes positioning means for maintaining said locking means in said first position.

4. An assembly as set forth in claim 3 wherein said adjustment means includes limit means cooperable with said support means to limit said relative movement between said adjustment means and said support means.

5. An assembly as set forth in claim 4 including biasing means disposed between said support means and said adjustment means for urging said adjustment means to move relative to said support means.

6. An assembly as set forth in claim 4 wherein said adjustment means comprises an elongated member made of organic polymeric material and disposed about said conduit, said support means having a passageway extending therethrough in a direction generally transverse to the longitudinal axis of said conduit, said locking means being disposed in said passageway for movement between said first and second positions in a direction generally transverse to the longitudinal axis of said conduit.

7. An assembly as set forth in claim 6 wherein said adjustment means has a circular cross section and said locking means includes a first circular bore therethrough with said first plurality of teeth thereabout and a second larger circular bore therethrough, said bores being in overlapping relationship so as to define an opening therebetween, said second bore being larger than said adjustment means for allowing said adjustment means to move longitudinally therethrough.

8. An assembly as set forth in claim 7 wherein said positioning means comprises the extremities of said opening, said extremities being spaced apart a distance which is less than the diameter of said adjustment means so that said locking means may be snapped into and out of said second position.

9. An assembly as set forth in claim 8 wherein said limit means comprises a pair of radial flanges at spaced positions along said adjustment means.

10. An assembly as set forth in claim 9 wherein said support means is made of organic polymeric material and includes a second passageway therethrough with said adjustment means being disposed therein.

11. An assembly as set forth in claim 10 including biasing means disposed between said support means and one of said flanges for urging said adjustment means to move relative to said support means.

12. An assembly as set forth in claim 11 including a tongue and groove means operatively interconnecting said locking means and said support means, and wherein said support means has a circular periphery and said locking means includes an arcuate cap which is contiguous with the circular periphery of said support means when in said first position, and said support means includes a snap-in means for insertion through an opening in a support structure to retain said support means thereto.

References Cited
FOREIGN PATENTS
567,728  2/1945  Great Britain _____ 74—501

MILTON KAUFMAN, Primary Examiner